Patented June 13, 1933

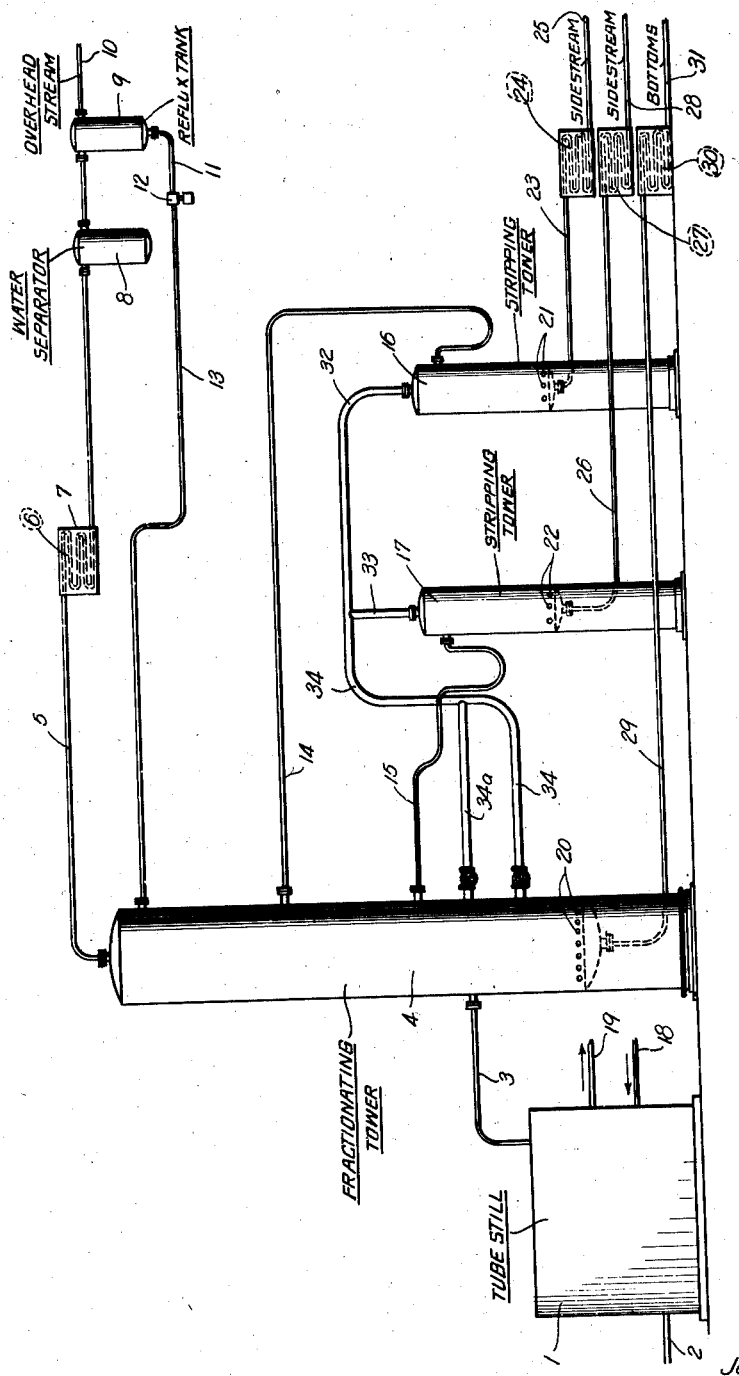

1,913,465

UNITED STATES PATENT OFFICE

JOHN S. WALLIS, OF NEW YORK, N. Y., ASSIGNOR TO ALCO PRODUCTS, INCORPORATED, OF NEW YORK, N. Y., A CORPORATION OF DELAWARE

METHOD OF FRACTIONATING VAPORS

Application filed March 30, 1931. Serial No. 526,148.

This invention relates to improvements in fractionating hydrocarbon vapors or vapors of a similar character, and refers more particularly to a method of stripping side streams removed from a fractionating tower. This method has to do with the stripping of side streams by introducing steam thereto and returning the steam and stripped vapors to a point in the tower where flashing of the vapors occurs or slightly therebelow, to reduce the partial pressure of the hydrocarbons which are supplied to the tower at this point.

The single figure is a diagrammatic view of a distillation apparatus in which the invention may be practised. Although the drawing discloses a tube still connected to a fractionating tower with proper condensing equipment, any type of distillation still is adaptable to practising the invention.

Referring to the drawing, a furnace is diagrammatically shown at 1. Oil is introduced through a pipe 2 and is circulated through a heating zone in the furnace where it is brought to distillation temperature. It is discharged from the furnace through a pipe 3 and is introduced into the fractionating tower 4 where it flashes into vapor and is subjected to the condensing action of liquid hydrocarbons which are coursed in an opposed direction to the passage of the vapor through the tower.

Uncondensed fractions pass over from the top of the tower through outlet line 5 through the condenser coil 6 positioned in a condenser box 7, thence to a water separator 8 and finally to a reflux tank 9. From the reflux tank the overhead stream is removed through a pipe 10 and a portion of this distillate recirculated through the pipe 11, pump 12, and line 13 to be charged back into the top of the tower where it serves as a fractionating medium flowing against the vapors which rise through the separate fractionating stages of the tower.

The fractionating tower shown at 4 is preferably of the bubble type, pools of liquid being maintained at different heights in the tower. The vapors rising through the tower are caused to bubble through the liquid pools. Side streams are taken off of the tower through pipes 14 and 15 and directed to the stripping towers 16 and 17 respectively.

Steam may be generated by introducing water or exhaust steam through pipe 18 into a heating coil or super-heater positioned in the furnace or still setting 1. The steam discharged passing out through the line 19 is directed through pipes not shown to the perforated coils 20 positioned in the bottom of the fractionating tower 4, and the smaller perforated coils 21 and 22 located in the stripping towers 16 and 17. By regulating the volume of steam introduced into the stripping towers the character of the side streams may be accurately controlled. The stripped side stream directed to the tower 16 is withdrawn from the stripping tower through a pipe 23 passed through a cooler coil 24 and finally withdrawn from the system through the pipe 25. The stripped side stream from the tower 17 is withdrawn through a line 26, thence directed through a cooling coil 27 to be discharged from the system through a pipe 28. The bottom removed from the tower 4 is diverted from the system through the pipe 29 and is passed through a cooling coil 30 after which it is directed through a line 31 to storage or to further processing. The control of the drawoff from the stripping towers and the main fractionating towers is preferably either by manually operated valves or by liquid level controlled valves. This regulation is not shown on the drawing, as it forms no part of the invention and is well-known practice.

The stripping steam and light vapors evolved from the towers 16 and 17 pass off through vapor lines 32 and 33 which unite in a common line 34. This line 34 diverges into two separate lines 34 and 34ª. The former is connected into the fractionating tower below the flash point or below the point at which the heated oil is supplied to the tower by the transfer line 3. The pipe 34ª is connected into the tower directly opposite the flash point or at the same height in the tower at which the transfer pipe is connected thereto.

By connecting the vapor lines carrying the stripping steam and light vapors to the fractionating tower at the point of flash or slightly therebelow, the stripping steam and light vapors are reused to reduce the partial pressure of the vapors at the point of flash. This gives a lower outlet still temperature than would otherwise be possible.

Although but two side streams are shown, the invention contemplates the use of a tower having any number of side streams taken off at different heights in the tower. By manifolding the vapors and steam from the external stripping section, a considerable volume of vapors and steam are accumulated for return to the tower.

With this proposed method the stripping steam and light vapors removed from the stripping sections assist in stripping the bottoms in the tower and at the same time reduce the partial pressure at the flash point in the tower, giving a lower temperature of vaporization which reduces the still outlet temperature for the same vaporization.

Previous practice has been to vent the external stripping sections at points in the tower at the same elevation from which the side streams are removed. Such practice is probably best illustrated by the patent to J. W. Lewis, No. 1,680,421, dated August 14, 1928.

As suggested, the conventional type of tube still connected to a multi-side stream fractionating tower with external stripping sections has been shown. This apparatus may be altered or varied without departing from the spirit and scope of the invention which broadly pertains to the utilization of the steam and light vapors as a means for reducing the partial pressure of the medium introduced to the fractionating tower. This reduction in partial pressure is accomplished by introducing the vapors and steam from the stripping sections to a point at or below the flash point of the tower.

I claim as my invention:

1. The method of fractionating hydrocarbon oils including the steps of heating a hydrocarbon oil to a vaporizing temperature, introducing the oil so heated into a fractionating zone having a plurality of stages of condensation, removing a liquid condensate from one stage of condensation, stripping the condensate so removed in an external stripping zone with steam, returning the vapors from the stripping zone to the fractionating zone and introducing them at a point at or below the point of introduction of the heated hydrocarbon oil, the method being such as to reduce the partial pressure prevailing in the fractionating zone.

2. The method of fractionating hydrocarbon oils including the steps of heating a hydrocarbon oil to a distillation temperature while passing the same in an elongated confined stream, introducing the oil so heated into a fractionating zone having a plurality of stages of condensation, removing liquid condensates from one or more stages of condensation, stripping the condensates so removed of their lighter constituents in external stripping stages, returning the vapors from the stripping zones to the fractionating zone and introducing them at a point at or below the point of introduction of the heated hydrocarbon oil, the method being such as to reduce the partial pressure in the fractionating zone.

In testimony whereof I affix my signature.

JOHN S. WALLIS.